Nov. 28, 1961 M. V. SULLIVAN 3,011,018

HIGHLIGHT APERTURE CORRECTION SYSTEM

Filed Sept. 26, 1956 3 Sheets-Sheet 1

INVENTOR
MICHAEL V. SULLIVAN
BY
Campbell, Brumbaugh, Free & Graves
HIS ATTORNEYS Nov. 28, 1961 M. V. SULLIVAN 3,011,018

HIGHLIGHT APERTURE CORRECTION SYSTEM

Filed Sept. 26, 1956 3 Sheets-Sheet 2

INVENTOR
MICHAEL V. SULLIVAN
BY
Campbell, Brumbaugh, Free & Graves
HIS ATTORNEYS INVENTOR
MICHAEL V. SULLIVAN
BY
Campbell, Brumbaugh, Free & Graves
HIS ATTORNEYS 3,011,018

HIGHLIGHT APERTURE CORRECTION SYSTEM

Michael V. Sullivan, Florham Park, N.J., assignor to Columbia Broadcasting System, Inc., New York, N.Y., a corporation of New York Filed Sept. 26, 1956, Ser. No. 612,221
7 Claims. (Cl. 178—6)

This invention relates to television, and more particularly to a new and improved aperture equalization method and means for correcting aperture distortion in the highlight regions of the television picture without increasing the high frequency noise which is inherent in the shadow areas of the picture information signal.

The effect known as aperture distortion has long been encountered in the transmission and reproduction of an image by television and by similar systems utilizing image scanning means. This distortion arises from the use of a scanning spot of finite size which produces a response proportional to the average light intensity within the image area covered by the spot at any instant. As a consequence, the sharpness of image borderlines of high contrast is reduced, resulting in a degradation of resolution and picture quality in the reproduced picture.

To overcome the aperture distortion inherent in television systems, an aperture equalizer comprising a transversal filter having a substantially linear phase-frequency characteristic is customarily used. Such aperture equalizers present minimum impedance to the frequencies represented by the rate of travel of the scanning spot over the elemental areas of the mosaic of the pickup tube, and higher impedance to other frequencies. Differences in image intensity between the adjacent elemental areas of the mosaic are thus enhanced, resulting in an improvement in borderline contrast resolution in the reproduced picture. Aperture equalizers of this type, however, also present a low impedance to high frequency noise signals which are concentrated in the signal amplitude levels corresponding to the low brightness or black-to-gray picture areas, resulting in degradation of quality in the shadow areas of the picture.

It is an object of this invention, accordingly, to provide a new and improved aperture equalization method and means for television systems in which aperture distortion is corrected only in the highlight areas of the picture, where the human eye perceives greater detail than in the shadow areas.

It is another object of this invention to provide a new and improved aperture equalization method and means for television systems whereby the gradient between adjacent elements of a high frequency information signal of varying amplitude may be restored after degradation, without increasing the noise level.

These and other objects of the invention are accomplished by dividing the picture information signal into two parts with respect to amplitude, applying the signal portion representing the gray-to-white region to an aperture equalizer, and recombining the two portions of picture information signal so that the resulting signal is corrected for aperture distortion only in the gray-to-white areas of the picture, while the noise signals associated with the low brightness or black-to-gray portion of the information signal are not appreciably increased.

Further objects and advantages of the invention will be apparent to those skilled in the art from a reading of the following detailed description of a typical embodiment, taken with reference to the accompanying drawings, in which.

Figure 2:
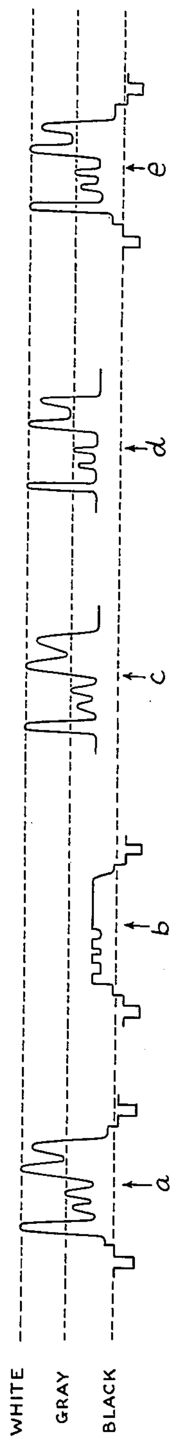
FIG. 2 illustrates the waveform of the television picture signal at various points in the aperture equalization system shown in FIG. 1.

Referring first to the block diagram of FIG. 1 and the graphic representations of the signal waveform of FIG. 2, a television picture information signal as illustrated in FIG. 2*a* is applied through one conductor, preferably a coaxial cable, to a so-called white clipper A, which passes only those portions of the input signal below a predetermined amplitude level corresponding to a predetermined black-to-gray region of the picture, as shown in FIG. 2*b*. The output signal from the white clipper A (FIG. 2*b*) is applied to a difference amplifier B which also receives the full range picture information signal (FIG. 2*a*). A delay line C may be interposed between the signal input and the difference amplifier B to compensate for any delay introduced by the white clipper A.

The output signal from the difference amplifier B, which has the waveform shown in FIG. 2*c*, is the difference between the waveforms shown in FIGS. 2*a* and 2*b*, and represents only the gray-to-white picture information. This signal is passed through an aperture equalizer D, which may be a conventional electrical wave filter of the type described in United States Patent No. 2,273,163, for example. The aperture equalizer D functions to increase the slope of the amplitude changes in the signal, thus compensating for contrast degradation resulting from the finite size of the scanning spot and reproducing the sharpness of the image borderlines of high contrast in the highlight areas as it occurred in the original picture. FIG. 2*d* illustrates the waveform of the signal after aperture distortion correction by the aperture equalizer D.

The aperture equalized gray-to-white signal and the black-to-gray signal from the white clipper A are recombined by a summing amplifier E into a full-range television picture signal having the waveform shown in FIG. 2*e*. A conventional delay line F or equivalent device may be interposed between the white clipper A and the summing amplifier E, if necessary, to compensate for the retardation of the gray-to-white signal by the aperture equalizer D.

Figure 3:
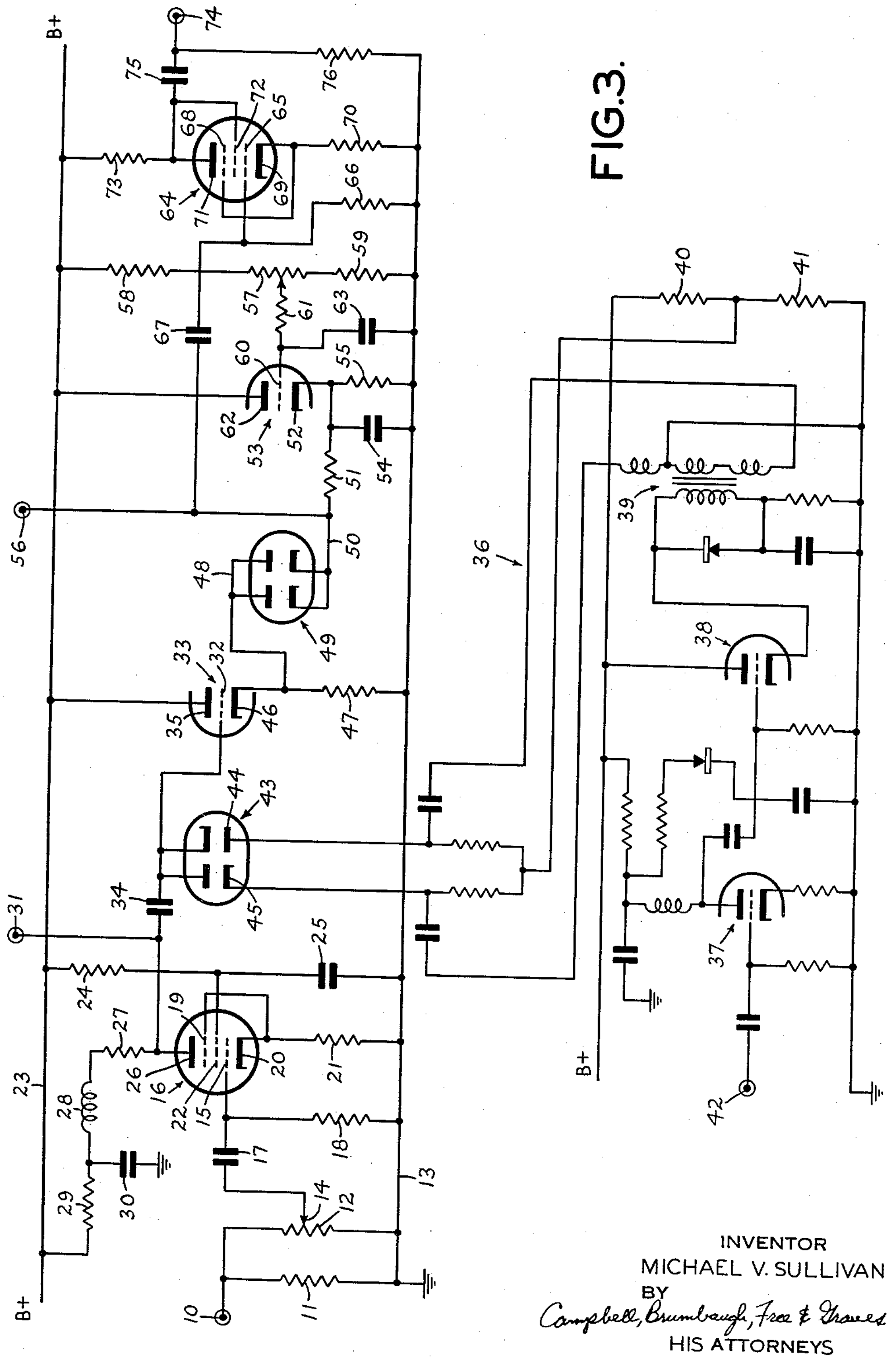
FIG. 3 is a circuit diagram of the input and white clipper portions of the system shown in FIG. 1.

Referring now to FIG. 3, which illustrates a practical form of aperture equalization system according to the invention, the composite video signal input is supplied to an input terminal 10 and is amplified in a conventional single stage amplifier including the pentode 16. The amplifier input circuit comprises a resistance 11, one end of which is connected to the ground conductor 13, a gain control potentiometer 12 having an adjustable tap 14 connected to the control grid electrode 15 of the tube 16 through a series condenser 17 and shunt resistor 18 combination.

The tube 16 may be one section of a dual tube such as the tube type 6AN8, for example. It has a suppressor grid electrode 19 and a cathode electrode 20 connected together and to ground through a resistor 21, and a screen grid electrode 22 connected to a B+ conductor 23 through a resistor 24 and to ground through a condenser 25. A plate electrode 26 is connected to the B+ conductor 23 through a series plate load impedance comprising a resistor 27, a choke 28 and another resistor 29, the junction of the choke 28 and the resistor 29 being connected to ground through a condenser 30. If desired, the gain of this stage may be changed by varying the setting of the adjustable tap 14 of the potentiometer 12.

Figure 1:
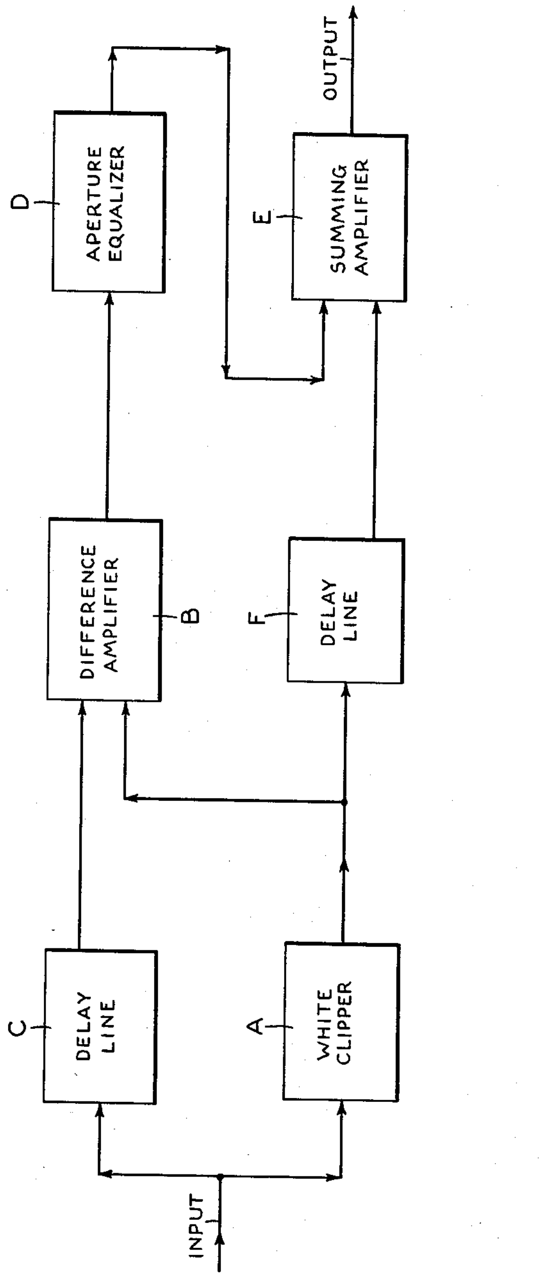
FIG. 1 is a block diagram of a typical highlight aperture equalization system constructed according to the invention.
Figure 4:
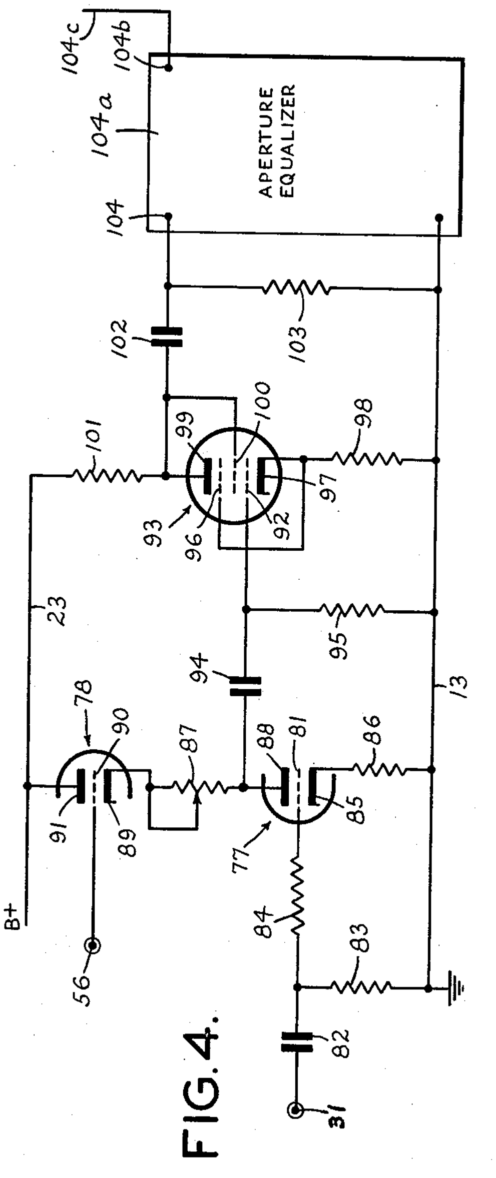
FIG. 4 is a circuit diagram of the difference amplifier portion of the system shown in FIG. 1.

The output of the tube 16 is supplied from the plate electrode 26 to the difference amplifier B of FIG. 1, which is illustrated in detail in FIG. 4, through a terminal 31, and to the control grid 32 of a triode 33, which constitutes part of the white clipper A (FIG. 1) through a condenser 34.

The control grid 32 of the triode 33 is clamped at a horizontal rate by clamping pulses synchronized with the horizontal drive pulses of the video signal. The clamping pulses may be generated by a typical clamping circuit such as the one illustrated generally at 36 comprising two triodes 37 and 38, a transformer 39 and a voltage divider consisting of two resistors 40 and 41 connected between the B+ conductor and ground. The two triodes 37 and 38 may each be the triode portions of dual-type triode-pentode tubes such as the 6AN8, for example. Negative horizontal scan drive pulses are applied at an input terminal 42 to generate the clamping pulses.

The construction and manner of operation of clamping circuits of this type is well known and need not be described in detail herein. Suffice it to say that the clamping pulses occur during the blanking time of the composite video signal immediately after each synchronizing pulse. One set of pulses in positive polarity is applied to the plate 44 of one diode and another set is applied in negative polarity to the cathode 45 of the other diode. The diodes are thereby caused to conduct and they connect the grid 32 of the tube 33 to a fixed bias voltage determined by the voltage divider comprising the resistors 40 and 41.

The cathode electrode 46 of the triode 33 is connected to ground through a cathode resistor 47 and the plate 35 is directly connected to the positive terminal of the plate supply. It will be understood that the output at the cathode 46 is the composite video signal to which a D.C. component has been restored. This output is fed to the electrically connected plate electrodes 48 of a double diode 49, which serves as a signal clipper, the electrically connected cathode electrodes 50 of which are connected to ground through the resistors 51 and 55, the latter being by-passed to ground by a condenser 54. The clipped video signal appearing at the cathode electrodes 50 of the diode 49 is supplied to the difference amplifier B of FIG. 1, which is illustrated in detail in FIG. 4, through a terminal 56.

The clipping level is determined by the bias voltage developed across the resistor 55 which is connected to the cathode 52 of a triode 53 having its plate 62 directly connected to the positive terminal of the plate supply voltage. The bias voltage is adapted to be varied by adjustment of a potentiometer 57 comprising part of a voltage divider including the resistors 58 and 59, the potentiometer 57 having an adjustable tap connected in series with a resistor 61 to the control grid 60 of the tube 53. The control grid 60 is by-passed to ground by a condenser 63.

If desired, the two triodes 33 and 53 may be sections of a dual-type tube such as the 6BZ7, for example, and the double diodes 43 and 49 may be tubes of the 6AL5 type.

In order to invert the clipped signal and provide a one volt signal to the input of a 75 ohm delay line 74, the clipped signal at the cathodes 50 of the diodes 49 is fed through a condenser 67 to the control grid 65 of a pentode 64, a resistor 66 being connected between the grid 65 and ground. The pentode 64, which may be of the 6CL6 type, for example, has its suppressor grid electrode 68 and its cathode electrode 69 connected together and to ground through a resistor 70, the plate electrode 71 being connected to the screen grid electrode 72 and to the B+ conductor 23 through a resistor 73.

The portion of the composite video signal representing only gray-to-white is obtained by supplying the composite signal to a difference amplifier of the type shown in FIG. 4. It comprises a pair of triodes 77 and 78, which may be contained in a single envelope as in the 6BZ7 type tube, for example. The plate 91 of the triode 78 is connected to the B+ lead 23 and the cathode 89 is connected in series with a potentiometer 87 to the plate 88 of the triode 77. The grid 90 of the triode 78 receives the clipped signal representing black-to-gray at the terminal 56.

The full range video signal is applied to the control grid 81 of the triode 77 through an input circuit including a series condenser 82, a shunt resistor 83 connected to ground, and a series resistor 84, the cathode electrode 85 of the amplifier also being connected to ground through a resistor 86.

Figure 5:
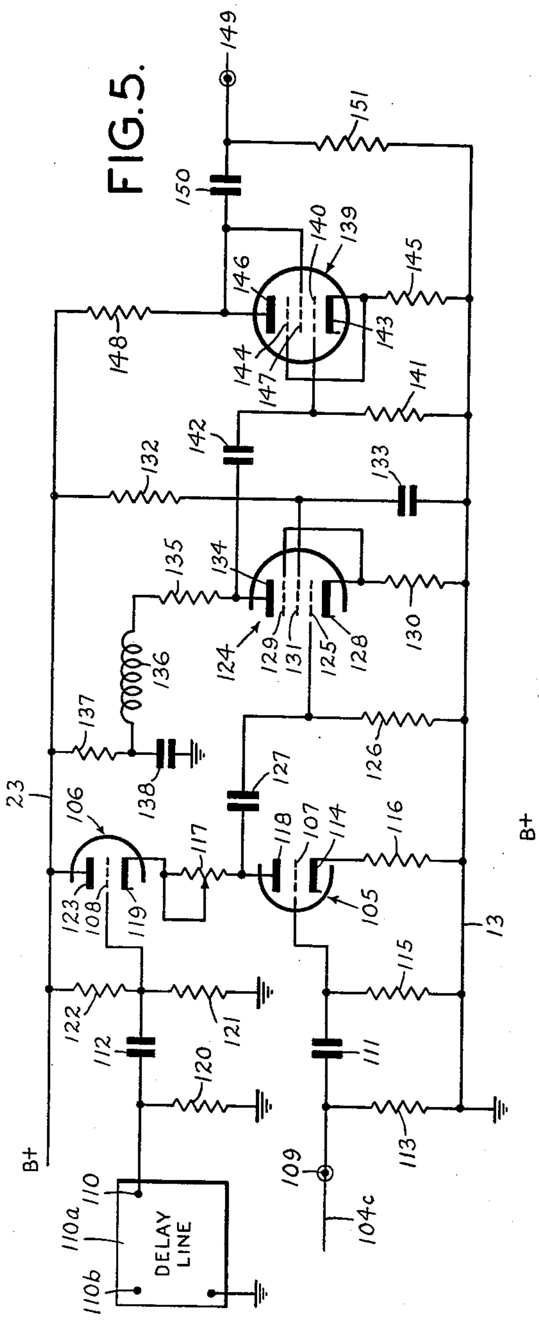
FIG. 5 is a circuit diagram of the summing amplifier and output portions of the system shown in FIG. 1.

The difference signal appearing at the plate electrode 88 of the triode 77 is applied to the control grid electrode 92 of a pentode 93 through a series condenser 94, the control grid electrode 92 being connected to ground through a resistor 95. The pentode 93, which may be of the 6CL6 type, has a suppressor grid electrode 96 and a cathode electrode 97 connected together and to ground through a resistor 98, the plate electrode 99 being connected to the screen grid electrode 100 and to the B+ conductor 23 through a resistor 101. The inverted difference signal is applied through a series condenser 102 and a shunt resistor 103 to one terminal 104 of a conventional aperture equalizer 104*a*, which may be of the type described in United States Patent No. 2,273,163, for example, the output terminal 104*b* of which is connected to the summing amplifier shown in detail in FIG. 5 by a conductor 104*c*.

The summing amplifier comprises a pair of triodes 105 and 106, which may be in a common envelope as in the type 6BZ7 tube, for example, having control grid electrodes 107 and 108.

The grid electrode 108 is connected to the junction of two resistors 121 and 122 forming a voltage divider connected to the B+ lead 23 and ground, and in series with a condenser 112 to the terminal 110 of a conventional delay line 110*a*, a resistor 120 being connected between the terminal 110 and ground. The terminal 110*b* of the delay line 110*a* is connected to receive the clipped output at the terminal 74 in FIG. 3. The delay line 110*a* serves to introduce sufficient delay to compensate for the delay introduced by the aperture equalizer 104*a* in FIG. 4.

The grid electrode 107 is connected in an input circuit including the series condenser 111, the shunt resistors 113 and 115 and the terminal 109 which is connected to receive the output at the terminal 104*b* of the aperture equalizer 104*a* (FIG. 4) through the conductor 104*c*.

A potentiometer 117 is connected between the plate electrode 118 of the triode 105 and the cathode electrode 119 of the triode 106 to provide adjustment of the gain of system in order to assure an accurate recombination of the two signals. Also, the plate electrode 123 of the triode 106 is connected directly to the B+ conductor 23.

The recombined video signal is amplified by a pentode 124 having a control grid electrode 125 connected to ground through a resistor 126 and to the plate electrode 118 of the triode 105 through a condenser 127. The cathode electrode 128 and the suppressor grid electrode 129 are connected together and to ground through a common resistor 130. The screen grid electrode 131 is connected to the B+ conductor 23 through a resistor 132 and to ground through a condenser 133. The plate electrode 134 is connected to the B+ conductor through a plate load impedance comprising a resistor 135, a high frequency compensating inductance 136 and another resistor 137, the junction of the inductance 136 and the resistor 137 being by-passed to ground through a condenser 138. The pentode 124 may comprise one portion of a dual-type pentode-triode tube such as the 6AN8, for example, if desired.

In order to drive an output signal of desired amplitude (e.g., one volt) into the impedance represented by the next input stage, which may be, say, 75 ohms, a pentode 139 such as a 6CL6 tube, for example, may be utilized. It has a control grid electrode 140 connected to ground through a resistor 141 and to the plate electrode 134 of the pentode amplifier 124 through a condenser 142. The cathode electrode 143 and the suppressor grid electrode 144 are connected together and to ground through a resistor 145, the plate electrode 146 being connected to the B+ conductor 23 through a plate load resistor 148. The recombined aperture-equalized signal appearing at the plate electrode 146 may be applied to an output terminal 149 through a condenser 150, the terminal 149 being shunted to ground through a resistor 151.

In considering the operation of the novel highlight aperture equalizing system described above, it will be observed that the action of the clamping circuit 36 and the double diode 43 maintains a constant blanking level so that the picture signal will always be clipped at the desired point in the shadow-to-highlight range of the signal.

Adjustment of the clipping level to any desired point in the brightness range may be made by varying the setting of the potentiometer 57 (FIG. 3). This changes the bias of the control grid 60 and causes more or less current to pass through the resistor 55, thereby increasing or decreasing the bias of the cathode electrode 50 of the double diode 49.

It is assumed that the input video signal applied to the amplifier 16 is in the form shown in FIG. 2*a*. This signal is inverted in the amplifier 16 so that at the control grid 32 of the triode 33 and at the output terminal 31 the higher signal amplitudes correspond to lower brightness levels. Since the tube 33 is connected in a cathode-follower arrangement, no signal inversion occurs, and the clipped signal appearing at the cathode electrode 50 and at the output terminal 56 remains inverted with respect to brightness.

It will be noted that the difference amplifier (FIG. 4) is arranged so that an increase in potential at the control grid 81 of the triode 77 decreases the potential at the control grid 92 of the tube 93, whereas an increase in the potential at the control grid 90 of the triode 78 has the reverse effect. Further, the potentiometer 87 is adjusted so that when identical signals are applied to the grids 81 and 90, respectively, of the two triodes 77 and 78, no signal will appear at the control grid 92. Under these conditions, when a full-range video signal is applied to the triode 77 and a clipped signal is fed to the triode 78, a difference signal, inverted with respect to amplitude, will appear at the control grid 92 of the tube 93.

As mentioned above, both the signals applied to the difference amplifier are inverted with respect to amplitude so that the difference signal thus produced is erect in form, the higher signal amplitudes corresponding to greater image brightnesses. This signal is again inverted by the action of the amplifier including the tube 93, so that an inverted signal appears at the output terminal 104.

Similarly, the gains of the summing amplifier triodes 105 and 106 are adjusted by means of the potentiometer 117 so that when identical signals are applied to the control grids 107 and 108 (FIG. 5) no signal is produced at the grid 125 of the tube 124. Hence, the clipped black-to-gray signal, after further inversion in the amplifier including the tube 64 (FIG. 3) is impressed on the control grid 108 of the tube 106 (FIG. 4) in erect form with respect to brightness, while the aperture equalized difference signal, consisting of gray-to-white information only, is applied to the control grid 107 in inverted form. As a result, an erect, full-range video signal is produced at the grid 125 of the tube 124. The action of the summing amplifier, therefore, is to recombine the clipped black-to-gray signal and the aperture-equalized gray-to-white signal into a full range television picture signal.

The recombined signal is amplified by the tube 124 (FIG. 5), the resulting inversion being corrected by the tube 139 so that a full range video signal, erect with respect to brightness and aperture-equalized in the gray-to-white region, is applied to the output terminal 149.

The invention thus provides a novel and highly effective aperture equalization method and means which corrects for aperture distortion in the important gray-to-white regions of the picture where the human eye is most sensitive, without materially increasing the noise level which predominates in the black-to-gray region.

The specific embodiment herein described is intended to be merely illustrative and not restrictive of the invention. Various modifications and changes in form and detail will be obvious to those skilled in the art within the scope of the following claims.

I claim:

1. In a method for reproducing visible information by means of a video signal varying in value as a function of a quality of successively scanned elemental areas of said visible information and subject to aperture distortion effects, the steps of deriving from said video signal components representing variations of said video signal in different ranges of amplitude values, respectively, emphasizing higher frequency components in one of said video signal components representing a given range of amplitude values to correct for aperture distortion caused by scanning of said elemental areas, and recombining said video signal components to produce a complete video signal similar to said first-named signal but corrected for aperture distortion in said given range of amplitude values.

2. In a method for reproducing visible information by means of a video signal varying in amplitude as a function of the brightness of successively scanned elemental areas of said visible information and subject to aperture distortion effects, the steps of deriving from said video signal components representing different ranges of amplitude variation of said video signal, respectively, emphasizing high frequency components in one of said signal components representing brighter elemental areas of said visible information to correct for aperture distortion caused by scanning of said elemental areas and combining said video signal components to form a complete video signal similar to said first-named video signal but corrected for aperture distortion in a range of amplitude variation representing said brighter elemental areas of said visible information.

3. In a system for reproducing visible information by means of a video signal varying in value as a function of a quality of successively scanned elemental areas of said visible information and subject to aperture distortion effects, the combination of means for deriving from said video signal a first video signal component representing variations of said video signal in a first range of amplitude values, means for deriving from said video signal a second video signal component representing variations of said video signal in a second range of amplitude values, means for correcting one of said signal components for the effects of aperture distortion caused by scanning said elemental areas, and means for combining the corrected signal component and the other of said signal components to form a complete video signal aperture corrected in a given region of amplitude values corresponding to a given range of variation of said quality.

4. In a system for reproducing visible information by means of a video signal varying in amplitude as a function of the brightness of successively scanned elemental areas of said visible information and subject to aperture distortion effects, the combination of means for deriving from said video signal a first video signal component representing variations of said video signal in a first range of amplitudes, means for deriving from said video signal a second video signal component representing variations of said video signal in a second range of amplitudes, means for correcting one of said signal components for the effects of aperture distortion caused by scanning said elemental areas, and means for combining the corrected signal component and the other of said signal components to form a complete video signal aperture corrected in a given region of amplitudes corresponding to a given brightness range of variation of said quality.

5. In a television system including image scanning means subject to aperture distortion, the combination of electrical means for dividing a television picture signal into at least two electrical signal components representing selected brightness level ranges of picture information, respectively, aperture equalizing means for correcting aperture distortion in at least one of said signal components, and electrical means for combining said corrected electrical signal component and the other of said signal components to form a complete television picture signal.

6. In a television system including image scanning means subject to aperture distortion effects, the combination of signal clipper means adapted to receive a television composite video signal and to clip amplitudes thereof above a predetermined value, means responsive to said video signal and to the output of said clipper means for producing a difference signal, means for emphasizing the higher frequency components of said difference signal to correct for the effects of aperture distortion, and means responsive to the outputs of said emphasizing means and said signal clipper means for producing a signal representative of the sum of said clipped signal and said difference signal.

7. In a television system including image scanning means subject to aperture distortion effects, the combination of keyed clamp amplifier means having input means adapted to receive a television composite video signal, signal clipper means for clipping amplitudes of the output of said amplifier means above a predetermined value, difference amplifier means responsive to said composite video signal and to said clipped output for providing a difference signal, means for correcting for the effects of aperture distortion in said difference signal, means for delaying said clipped signal, and summing amplifier means responsive to said corrected difference signal and to said delayed clipped signal for reconstructing a composite video signal similar to said first-named composite video signal but correct for aperture distortion in only a given range of amplitudes thereof.

References Cited in the file of this patent

UNITED STATES PATENTS

| | | |
|---|---|---|
| 2,273,163 | Wilson | Feb. 17, 1942 |
| 2,691,696 | Yule | Oct. 12, 1954 |
| 2,697,758 | Little | Dec. 21, 1954 |
| 2,740,912 | Graham | Apr. 3, 1956 |
| 2,791,751 | Fine et al. | May 7, 1957 |